United States Patent
Sommereisen

(10) Patent No.: US 6,517,079 B1
(45) Date of Patent: Feb. 11, 2003

(54) GAS SEAL FOR CONTINUOUS THERMAL TREATMENT FACILITIES OPERATED WITH A PROTECTIVE GAS ATMOSPHERE

(76) Inventor: Winfried Sommereisen, Alfonsstrasse 19-21, D-52070 Aachen (DE)

( * ) Notice: Subject to any disclaimer, the term of this patent is extended or adjusted under 35 U.S.C. 154(b) by 0 days.

(21) Appl. No.: 09/581,370

(22) PCT Filed: Aug. 26, 1999

(86) PCT No.: PCT/DE99/02667
§ 371 (c)(1),
(2), (4) Date: Jun. 12, 2000

(87) PCT Pub. No.: WO00/22363
PCT Pub. Date: Apr. 20, 2000

(30) Foreign Application Priority Data

Oct. 12, 1998 (DE) .......................... 198 46 749

(51) Int. Cl.⁷ ........................... F16J 15/40; F01D 11/04
(52) U.S. Cl. ....................... 277/431; 277/432; 277/906
(58) Field of Search .............................. 277/431, 432, 277/906; 432/64; 34/242

(56) References Cited

U.S. PATENT DOCUMENTS

| | | | |
|---|---|---|---|
| 1,595,486 A | * 8/1926 | Minton ......................... 277/432 |
| 3,351,348 A | * 11/1967 | Dupuis ......................... 118/50 |
| 3,510,113 A | * 5/1970 | Wise ............................ 34/638 |
| 4,442,611 A | 4/1984 | Gunther et al. |
| 4,794,855 A | * 1/1989 | Okajima et al. ............. 100/154 |
| 4,894,009 A | 1/1990 | Kramer et al. |
| 4,915,622 A | * 4/1990 | Witmer ....................... 432/115 |
| 5,471,765 A | * 12/1995 | Rautakorpi et al. ......... 162/371 |

FOREIGN PATENT DOCUMENTS

GB          2 008 162          5/1979

* cited by examiner

Primary Examiner—Anthony Knight
Assistant Examiner—Michael J. Kyle
(74) Attorney, Agent, or Firm—John C. Purdue; David C. Purdue

(57) ABSTRACT

An aerodynamic seal for a continuous heat treatment furnace which contains a protective atmosphere, and through which a metal strip moves in a given direction is disclosed. The seal is adjacent a passage through which the strip moves through a wall of the furnace, and comprises two slit nozzles above the strip and two slit nozzles below the strip, and inlets for causing a jet of gas to flow through each of the slit nozzles. The slit nozzles are so positioned that gas flowing normal to the strip through the two nozzles above the strip will strike the strip in two lines which are separated from one another in the given direction, and gas flowing normal to the strip through the two nozzles below the strip will strike the strip in two lines which are separated from one another in the given direction. The slit nozzles are operable to direct jets of gas toward the strip in a direction that is either normal to the strip or diverges from normal away from a jet of gas from the other of the nozzles on the same side of the strip. The seal causes a flow which consists of a protective gas through the two nozzles which are closer to the furnace, and causes air to flow through the two nozzles which are farther from the furnace.

9 Claims, 1 Drawing Sheet

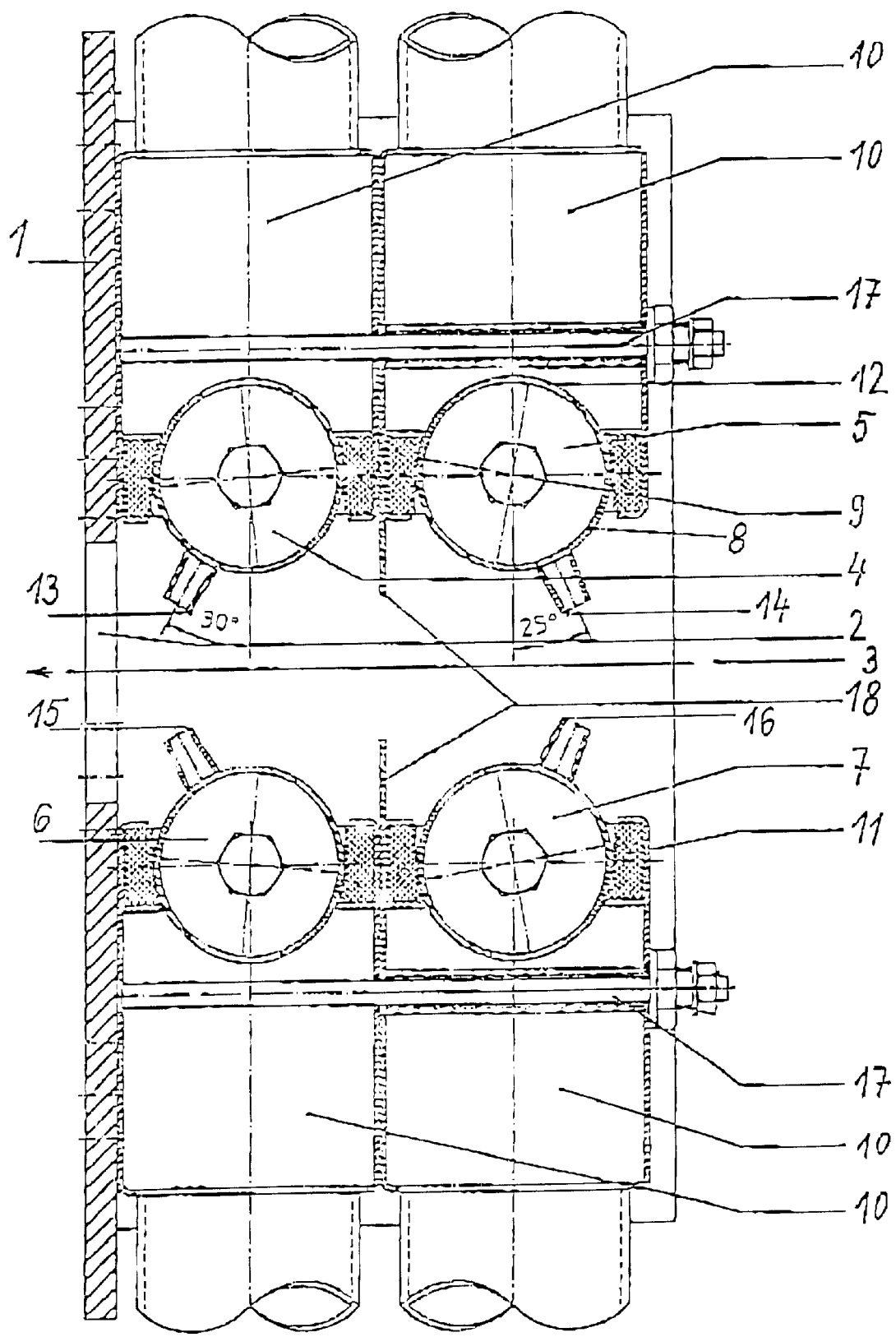

GAS SEAL FOR CONTINUOUS THERMAL TREATMENT FACILITIES OPERATED WITH A PROTECTIVE GAS ATMOSPHERE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING

Not Applicable

BACKGROUND OF THE INVENTION

1. Field of the Invention

The invention relates to an aerodynamic seal for continuous thermal treatment plants with a protective gas atmosphere, having slit nozzles which delimit an orifice cross section to be sealed off in the continuous thermal treatment plant and which are directed onto a metal strip running through.

In various industrial plants, it is necessary to have non-contact seals between two gas zones. Thus, the problem is either that gases or vapours occurring within a chamber should not pass into the outside atmosphere or that atmospheric air should not be introduced, for example, into a chamber to which protective gas is applied. The chamber should nevertheless be freely accessible, so that the contact-sensitive material to be treated can be supplied.

Continuous furnaces for sheet-metal strips, for example, have such a requirement. The thermal treatment of easily oxidizing metal sheets is carried out in the furnace under protective gas. On account of the surface sensitivity of the sheet-metal strips, however, mechanical sealing of the furnace orifice relative to the outside atmosphere should be avoided as far as possible.

In the instances mentioned above, therefore, aerodynamic seals are used, in which a gas jet separates the two gas zones from one another.

2. Description of the Related Art Including Information Disclosed Under 37 CFR 1.97 and 1.98

DE-C-37 43 598 discloses an aerodynamic seal with a double slit nozzle. The nozzle has a middle partition which provides two nozzle spaces, into which the gas of the gas zones to be sealed off from one another is introduced in each case. The gas jet together with its two part-jets impinges with its core region onto an impact surface which is formed, for example, by the sheet-metal strip running into a continuous furnace. Since only slight turbulence prevails in the core region of the gas jet, intermixing of protective gas and air should be largely avoided.

The solution requires the double slit nozzle or nozzles to be positioned as near as possible to the surface of the strip running through, in order to achieve a good sealing effect. However, since strips of this type are never completely flat, but have bulges and corrugations and, at the run-through speeds reached, small strip movements also occur perpendicularly to the strip surface, this requirement cannot be fulfilled without further action. The double slit nozzles must therefore be arranged at a specific minimum distance from the strip running through and, for this purpose, have a corresponding slit width. Intermixings of air and protective gas may nevertheless occur, so that, on the one hand, protective gas losses arise and, on the other hand, air may penetrate into the furnace.

Furthermore, DE 44 41 690 A1 discloses an aerodynamic seal, for example for continuous furnaces. Here too, two gases emerging in parallel from a chamber divided in two form a gas curtain perpendicularly to a conveyor band. This version entails the abovementioned disadvantages of the seal from DE-C-37 43 598. It also proves a disadvantage, here, that the chamber outlet orifice is subdivided into tiny orifices by means of a perforated plate, thus causing a barrier gas jet to have a lower flow velocity. A barrier gas jet of this type is unsuitable for counteracting a flow pulse from a system operated with inert gas.

Moreover, DE-C-973 548 discloses a seal in the form of barrier air jets, which is used on rotating regenerative heat exchangers. In this case, hot smoke gas and cool air flowing in countercurrent to the latter are conducted next to one another through a rotor provided with heating plates. The smoke gas and air are separated by means of barrier air jets. The nozzles for this purpose are arranged between the smoke-gas region and the air region above and below the rotor. Barrier air is blown out of these nozzles through the rotor at high velocity, and this barrier air is subsequently sucked away again The barrier air jet generated in this way is unsuitable for strips, since, unlike a rotor provided with heating plates, a strip cannot be penetrated by a barrier air jet.

BRIEF SUMMARY OF THE INVENTION

The object on which the invention is based is to specify an aerodynamic seal of the type mentioned in the introduction, by means of which the intermixing of the gases involved is further reduced.

The object is achieved, according to the invention, in that each side of the metal strip is assigned two separate slit nozzles which are arranged at a distance one behind the other in the run-through direction of the metal strip and each generate a gas jet directed perpendicularly onto the metal strip or, pointed away from one another, at an angle onto the metal strip and of which the slit nozzles directed onto the side of the atmosphere have air applied to them and the slit nozzles directed towards the side of the continuous thermal treatment plant have protective gas applied to them.

BRIEF DESCRIPTION OF THE DRAWING

The drawing is a partially schematic, fragmentary view in elevation showing an aerodynamic seal according to the invention and a fragment of an associated thermal treatment plant.

DETAILED DESCRIPTION OF THE INVENTION

Preferably, for the purpose of setting their angle, the slit nozzles are arranged so as to be rotationally movable. They are expediently arranged on tubular, rotatably mounted gas supply bodies connected to gas ducts. The said gas supply bodies are sealed off relative to the respectively assigned gas duct, for example on both sides, by means of a plate-shaped seal and are provided, towards the longitudinal axis of the respective gas duct, with an orifice slit.

The jet axis can thus be set to the conditions which arise due to the strip running through which is to be treated in each case. It becomes possible, at the same time, to vary the distance between the slit nozzles and the metal strip by means of rotation.

It is advantageous that different angles of the two gas jets from the laterally adjacent slit nozzles can be set. Consequently, pressure equalization between the two gas zones can also be produced in a simple way if work is carried out in a gas zone with a higher pressure, as is usually the case in the continuous furnaces described. In this instance, the slit nozzles can then also be operated not only with a different jet angle, but also with a different gas pressure.

If more comprehensive pressure sealing is required, the arrangement may be supplemented, as in a way known hitherto, by additional pressure nozzles which are positioned between the slit-nozzle arrangement described here and the chamber to which pressure is applied. The jet axis of the pressure nozzles is rotated in the direction of the chamber. In order then to reduce the gas pressure in the region between the slit nozzles and the pressure nozzles, a suckaway device is to be provided in each case there.

In the space between laterally adjacent slit nozzles of the arrangement according to the invention, a turbulent gas mixture builds up between the two gas components involved, but only very small quantities of this gas mixture can overcome the orifice cross section to be sealed off. In order to prevent even this, a suckaway device and/or a burner may be arranged in the region between the slit nozzles on each side of the metal strip, so that, by the gas mixture being sucked away, a slightly lower pressure is established in this space than, for example, in the furnace chamber, or the oxygen fraction in this gas mixture is burnt substoichiometrically. Another variant is to introduce protective gas into this space.

One possibility for further limiting intermixing in the space between the slit nozzles is to divide this space in each case by means of a partition which runs perpendicularly to the metal strip running through and reaches near to the latter.

The passage of gas between the two gas zones can also be further reduced by the space between the slit nozzles being kept as small as possible, in that only a narrow duct is left between the slit nozzles. For this purpose, the slit nozzles are expediently connected in each case by means of a cover parallel to the metal strip running through.

The invention will be explained in more detail by means of an exemplary embodiment. The accompanying drawing shows a cross section through the passage region of a continuous furnace for the thermal treatment of sheet-metal strips with an aerodynamic seal.

The continuous furnace is provided with a furnace wall 1, in which a strip passage 2 for a sheet-metal strip 3 is left. The run-through direction is indicated by an arrow. The continuous furnace is operated under a protective gas atmosphere.

The aerodynamic seal consists of two slit nozzles 13, 14 and 15, 16 in each case on both sides of the sheet-metal strip 3, the said slit nozzles being arranged on gas supply bodies 4, 5 and 6, 7. The slit nozzles 13 and 15 directed towards the furnace side are fed with protective gas and the slit nozzles 14 and 16 directed to the outside are fed with air.

The gas supply bodies 4 to 7 are composed of pipe sections 8 which are mounted so as to be rotationally movable on shafts 9. The said bodies are sealed off by means of sealing plates 11 relative to blast boxes 10 forming gas ducts. For routing the gas, the said bodies are provided with passage orifices 12 on the sides which project into the blast boxes 10.

The entire arrangement is connected to the furnace wall 1 by screw connections 17.

The sheet-metal strip 3 forms an impact plate for the nozzle arrangement. In the space between the slit nozzles 13, 14 and 15, 16, a gas mixture of protective gas and air is formed, the intermixing of which is limited by a partition plate 18.

What is claimed is:

1. An aerodynamic seal outside a continuous heat treatment furnace which contains a protective atmosphere, and through which a metal strip moves in a given direction, said seal being adjacent a passage through which the strip moves through a wall of the furnace, and comprising two slit nozzles above the strip and two slit nozzles below the strip, and an inlet for causing a jet of gas to flow through each of the slit nozzles, the slit nozzles being so positioned that gas flowing normal to the strip through the two nozzles above the strip will strike the strip in two lines which are separated from one another in the given direction, and gas flowing normal to the strip through the two nozzles below the strip will strike the strip in two lines which are separated from one another in the given direction, and the slit nozzles being operable to direct jets of gas toward the strip in a direction that is either normal to the strip or diverges from normal away from a jet of gas from the other of the nozzles on the same side of the strip, an inlet for a flow which consists of a protective gas through the two nozzles which are closer to the furnace, and an inlet for air to flow through the two nozzles which are farther from the furnace.

2. An aerodynamic seal as claimed in claim 1 wherein the slit nozzles are mounted for rotation to change the angle between gas flowing from each and the strip.

3. An aerodynamic seal as claimed in claim 2 wherein the slit nozzles are mounted for rotation with gas supply pipes.

4. An aerodynamic seal as claimed in claim 3 which additionally includes plate-shaped seals on both sides of each of the gas supply pipes sealing each relative to an associated gas duct and wherein there is an orifice slit in each of the gas supply pipes.

5. An aerodynamic seal as claimed in claim 4 which additionally includes an exhaust operable to remove gas from between the two slit nozzles above the strip and from between the two slit nozzles below the strip.

6. An aerodynamic seal as claimed in claim 4 which additionally includes a burner operable to burn gas between the two slit nozzles above the strip and between the two slit nozzles below the strip.

7. An aerodynamic seal as claimed in claim 4 which additionally includes an inlet through which a protective gas can be introduced between the two slit nozzles above the strip and between the two slit nozzles below the strip.

8. An aerodynamic seal as claimed in claim 4 which additionally includes partitions between the two slit nozzles above the strip and between the two slit nozzles below the strip.

9. An aerodynamic seal as claimed in claim 6 which additionally includes a cover between the adjacent sides of the two slit nozzles above the strip and a cover between the adjacent sides of the two slit nozzles below the strip.

* * * * *